(12) United States Patent
Sallee

(10) Patent No.: US 7,059,200 B2
(45) Date of Patent: Jun. 13, 2006

(54) FLOW MEASUREMENT SYSTEM AND METHOD

(75) Inventor: Richard A. Sallee, Houston, TX (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 10/969,428

(22) Filed: Oct. 20, 2004

(65) Prior Publication Data

US 2006/0081068 A1    Apr. 20, 2006

(51) Int. Cl.
    *G01F 1/07*        (2006.01)
(52) U.S. Cl. .................................................. 73/861.88
(58) Field of Classification Search ............. 73/861.88, 73/273, 861.77, 272; 340/870.02
    See application file for complete search history.

(56) References Cited

U.S. PATENT DOCUMENTS 5,777,222 A *   7/1998   Roberts ........................ 73/273
6,100,816 A *   8/2000   Moore ................... 340/870.02

OTHER PUBLICATIONS

Itron, "Hot News", http://www.itron.com/, Copyright 2004, 1 pg.
Itron, "Product Center", http://www.itron.com/products/, Copyright 2004, 3 pgs.
Itron, "Meter Modules", www.itron.com/products/radio_based.html, Sep. 21, 2004, pp. 1-3.
Itron, "Functionality Profile 41ER-1 ERT Module", Copyright 2003, 2 pgs.
Itron, "Functionality Profile 45EN-1 ERT Module", Copyright 2003, 2 pgs.
Itron, "Functionality Profile, 45ER-1 ERT Module", Copyright 2003, 2 pgs.
Itron, "Functionality Profile 45ES-1 ERT Module", Copyright 2003, 2 pgs.
Elster Electricity LLC, "A3 Alpha® Meter with 50ESS ERT®", Mar. 2004, 2 pgs.
Itron, "40G ERT® Commercial", Copyright 2002, 2 pgs.
Itron, "40G ERT® Module", Copyright 2001, 2 pgs.
Itron, "40G ERT® Module Remote", Copyright 2002, 2 pgs.
Marc Keyes, "Electric ERT® Meter Compatibility Chart", Dec. 22, 2003, Itron Inc., 5 pgs.
Sensus Metering Systems, "Electronic Network Meter with integrated Itron® 51 ESS ERT Type iNA1", Jul. 2004, 2 pgs.
Invensys Metering Systems, "Electronic Meter Technical Manual", Copyright 2002, 37 pgs.
American Meter Company, "American Meter Company", www.americanmeter.com, Sep. 27, 2004, pp. 1-2.

(Continued)

*Primary Examiner*—Jewel V. Thompson
(74) *Attorney, Agent, or Firm*—Fish & Richardson P.C.

(57)  ABSTRACT

Flow measurement systems and techniques may allow flow information to be wirelessly transmitted. The systems and techniques may include a meter index cover and a wireless meter transmitter adapter. The meter index cover may be configured and arranged to house a meter index and include a mounting member configured and arranged to couple to a variety of wireless meter transmitter adapters. The wireless meter transmitter adapter may be configured and arranged to couple to the mounting member and to couple to a wireless meter transmitter.

2 Claims, 4 Drawing Sheets

OTHER PUBLICATIONS

American Meter Company, "Products & Services", www.americanmeter.com/en/products_and_services.shtml., Sep. 27, 2004, 2 pgs.

American Meter Company, "General Product Catalog", May 2003, 24 pgs.

American Meter Company, "Systems & Solutions", www.americanmeter.com/en/systems_solutions.html, Sep. 27, 2004, 1 pg.

American Meter Company, "TRACE VRT", www.americanmeter.com/en/trace_vrt, Sep. 27, 2004, 2 pgs.

AMCO Automated Systems LLC, "Welcome to AMCO Automated Systems", Copyright 2003, 1 pg.

AMCO Automated Systems LLC, "Product Listing", www.amcoas.com/Publication, Sep. 27, 2004, 1 pg.

AMCO Automated Systems LLC, "Direct Electric-Meter Transponder (DET)", Sep. 2002, 2 pgs.

AMCO Automated Systems LLC, "Direct Gas-Meter Transponder (DGT)", Sep. 2002, 2. pgs.

AMCO Automated Systems LLC, "Remote Water-Meter Transponder (RWT)", Sep. 2002, 2 pgs.

AMCO Automated Systems LLC, "Pit Water-Meter Transponder (PWT)", Sep. 2002, 2 pgs.

Cellnet, "Data Solutions Overview", www.cellnet.com/dataSolutions.html, Sep. 27, 2002, 2 pgs.

Cellnet, "Infinet Overview", www.cellnet.com/infinet-overview.html, Sep. 27, 2004, 2 pgs.

Cellnet, "Infinet Literature", www.cellnet.com/infinet-literature.html, Sep. 27, 2004, 2 pgs.

Cellnet, "UTILITYDATALINK$^{SM}$ and MYENERGYINFO$^{SM}$", Jul. 2004, 2 pgs.

Cellnet, "Infinet Data Collection", Jul. 2004, 2 pgs.

Cellnet, "Infinet.Gateway", Jul. 2004, 2 pgs.

Cellnet, "Mutlifunction Meter Module", Jul. 2004, 2 pgs.

Cellnet, "UTILITYDATALINK$^{SM}$ and MYENERGYINFO$^{SM}$", Dec. 2003, 2 pgs.

Cellnet, "Utilinet Overview", www.cellnet.com/utilinet-overview.html, Sep. 27, 2004, 3 pgs.

Cellnet, "Utilinet Products", www.cellnet.com/utilinet-products.html, Sep. 27, 2004, 1 pg.

Cellnet, "Individual Radios", www.cellnet.com/radios.html, Sep. 27, 2004, 1 pg.

Cellnet, "Utilinet® Series II Wangate Radio", www.cellnet.com/wangateRadio.html, Sep. 27, 2004, 1 pg.

Cellnet, "Utilinet® Series II IWR Radio", www.cellnet.com/iewRadio.html, Sep. 27, 2004, 1 pg.

Cellnet, "Micrortu Wangate Radio", www.cellnet.com/microRTURadio.html, Sep. 27, 2004, 2 pgs.

Cellnet, "Utilinet Literature", www.cellnet.com/utilinet-literature.html, Sep. 27, 2004, 2 pgs.

Schlumberger Sema, "Utilinet® Wireless Without Limits", Oct. 2002, 8 pgs.

Schlumberger Sema, "Utilinet® WanGate Radios", Oct. 2002, 4 pgs.

SchlumbergerSema, "Utilinet® Radio Shop", Apr. 2002, 122 pgs.

* cited by examiner

FLOW MEASUREMENT SYSTEM AND METHOD

TECHNICAL FIELD

This disclosure relates to flow management and, more particularly, to flow measurement.

BACKGROUND

Flow measurement devices and techniques are used in a wide variety of environments for residential, commercial, and industrial applications. For example, flow measurement devices may be used for monitoring flow rate, amount, pressure, and/or temperature in transport pipelines, storage facilities, and/or customer supply lines. In many of these environments and applications, it is not uncommon for it to be difficult for a flow measurement device or technique to connect to a remote device. Also, for environments and applications that require intrinsically safe devices or techniques, external connections are commonly disfavored. Thus, flow measurement devices and techniques that do not require external connections are often quite beneficial.

Many flow measurement devices and techniques use a wireless transmitter to provide data to a remote device. Using a wireless transmitter avoids the need for external connections and/or visual inspection in remote, difficult to access, and/or dangerous environments. A wireless transmitter may be internal or external to a housing of a flow measurement device and be designed to work with a particular type of flow measurement device or technique.

SUMMARY

Flow measurement may be accomplished by systems and techniques that sense flow and include a wireless meter transmitter to wirelessly transmit information regarding the flow. In one general aspect, a system for flow measurement includes a meter body, a meter index, a meter index cover, a wireless meter transmitter adapter, and a wireless meter transmitter. The meter body may house a flow measuring device operable to produce an indication of a flow from an inlet of the meter body to an outlet of the meter body. The meter index may be coupled to the meter body and operable to display flow information in response to the indication. The meter index cover may be coupled to the meter body and configured and arranged to house the meter index. The meter index cover may define an opening through which the meter index is received and include a mounting member configured and arranged to couple to a variety of wireless meter transmitter adapters. The mounting member may be integral with the meter index cover. The meter index cover may also include at least a transparent region through which a display portion of the meter index can be seen. The wireless meter transmitter adapter may be coupled to the mounting member and configured and arranged to allow coupling to a wireless meter transmitter. The wireless meter transmitter may be coupled to the wireless meter transmitter adapter.

The system may also include a drive member adapter coupled between a drive member of the meter index and a drive member of the wireless meter transmitter. The mounting member may include a drive member that is coupled between the meter index drive member and the drive member adapter. An end of the mounting member drive member opposite the meter index may include a tongue, and the drive member adapter may include a slot for receiving the tongue.

In certain implementations, the mounting member may be a cylinder with a closed end. Also, the mounting member and the wireless meter transmitter adapter may be configured and arranged to couple to each other in at least two orientations. The wireless meter transmitter adapter may include a plurality of apertures for coupling to the mounting member and a plurality of apertures for coupling to the wireless meter transmitter. The wireless meter transmitter adapter may also include a drain to allow moisture to exit the system.

In another general aspect, a method for manufacturing a flow measurement system includes providing a meter index cover including a mounting member configured and arranged to couple to a variety of wireless meter transmitter adapters, coupling a wireless meter transmitter adapter to the mounting member, and coupling a wireless meter transmitter to the wireless meter transmitter adapter.

Providing a meter index cover including a mounting member may include coupling the mounting member to the meter index cover. Coupling a wireless meter transmitter adapter to the mounting member may include inserting screws into apertures in the mounting member and apertures in the wireless meter transmitter adapter.

The method may also include determining the proper orientation of the wireless meter transmitter and orienting the wireless meter transmitter adapter to achieve the orientation.

Particular implementations may include removing a second meter index cover from a meter body that houses a flow measuring device operable to produce an indication of a flow from an inlet of the meter body to an outlet of the meter body, the second meter index cover housing a meter index, removing the meter index from the second meter index cover, substituting the first meter index cover for the second meter index cover, and coupling the meter index to the first meter index cover.

The method may also include coupling a meter index to the meter index cover and coupling a drive member adapter between a drive member of the wireless meter transmitter and a drive member of the meter index. A drive member of the mounting member may also be coupled between the meter index drive member and the drive member adapter.

In another general aspect, a system for flow measurement includes a meter index cover and a wireless meter transmitter adapter. The meter index cover may be configured and arranged to house a meter index and include an opening through which a meter index is received and a mounting member configured and arranged to couple to a variety of wireless meter transmitter adapters. The wireless meter transmitter adapter may be configured and arranged to couple to the mounting member and to couple to a wireless meter transmitter. The mounting member and the wireless meter transmitter adapter may be configured and arranged to couple to each other in at least two orientations.

The system may also include a meter body housing a flow measuring device operable to produce an indication of a flow from an inlet of the meter body to an outlet of the meter body, a meter index operable to display flow information in response to the indication, and a wireless meter transmitter operable to wireless send flow information.

The mounting member may include a drive member that is configured and arranged to couple between a meter index drive member and a wireless meter transmitter drive member. The mounting member drive member may also be operable to couple to a drive member adapter.

The wireless meter transmitter adapter may include a plurality of apertures for coupling to the mounting member and a plurality of apertures for coupling to a wireless meter transmitter. The wireless meter transmitter adapter may also include a drain to allow moisture egress.

In a particular aspect, a system for flow measurement includes a meter body, a meter index, a meter index cover, a wireless meter transmitter adapter, a wireless meter transmitter, and a drive member adapter. The meter body may house a flow measuring device operable to produce a movement indicative of a flow from an inlet of the meter body to an outlet of the meter body. The meter index may be coupled to the meter body and operable to display an indication of a flow in response to the movement. The meter index cover may be coupled to the meter body and configured and arranged to house the meter index. The meter index cover may also define an opening through which the meter index is received and include a transparent region through which a display portion of the meter index can be observed and an integral mounting member configured and arranged to couple to a variety of wireless meter transmitter adapters. The mounting member may include a drive shaft that is coupled to a drive member of the meter index on one end and that includes a tongue on the other end. The wireless meter transmitter adapter may be coupled to the mounting member and be configured and arranged to allow coupling to the mounting member in at least two orientations and to allow coupling to a wireless meter transmitter. The wireless meter transmitter adapter may also include a drain to allow moisture to exit the system. The wireless meter transmitter may be coupled to the wireless meter transmitter adapter and include a drive member. The drive member adapter may be coupled between the mounting member drive member and the wireless meter transmitter drive member and include a slot for receiving the tongue.

The system and techniques may have various features. For example, a fluid measurement system may be manufactured and/or retrofitted with a wireless meter transmitter. This may provide ease of managing and controlling a fluid flow system. As another example, multiple types of wireless meter transmitters may be coupled to a fluid meter. Thus, a manufacturer, installer, and/or retrofitter of a fluid meter is not bound to using one type of wireless meter transmitter with a particular type of fluid meter, which may provide consistency and ease of operation across a fluid meter network. As a further example, a wireless meter transmitter may be installed at a preferred orientation. This may assist in readily retrieving flow information.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Flow measurement may be efficiently performed by a flow meter that senses flow and includes a wireless meter transmitter to wirelessly transmit information regarding the flow. In particular implementations, a wireless meter transmitter may be coupled to a flow meter by an interchangeable adapter. Thus, various types of wireless meter transmitters may be readily coupled to the flow meter. Also, interchangeable drive member adapters may be used to achieve the coupling between the flow meter and the wireless meter transmitter. Other implementations, however, are possible.

Figure 1:
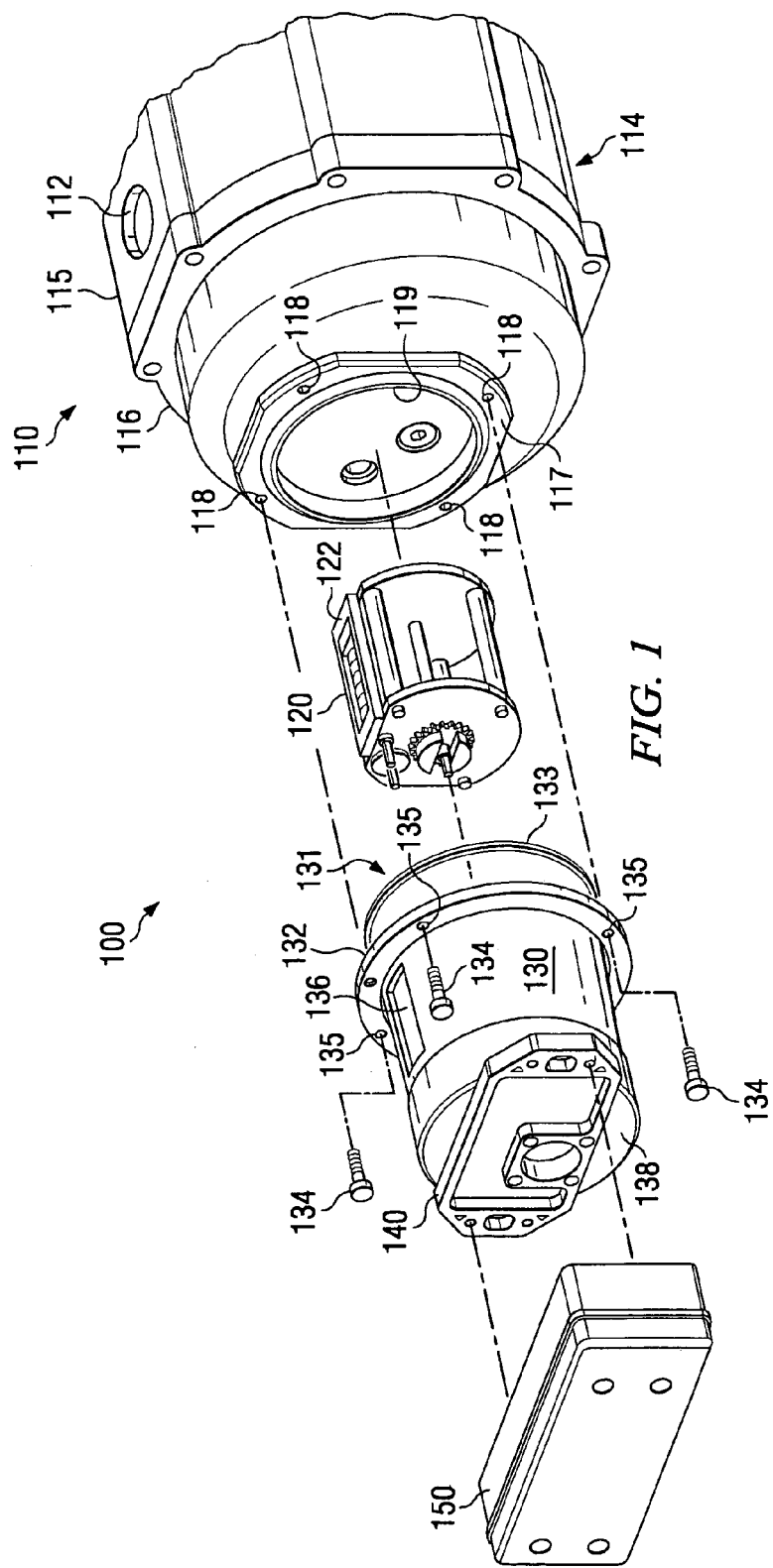
FIG. 1 is an exploded perspective view illustrating one implementation of a flow measurement system.

FIG. 1 illustrates one implementation of a flow measurement system 100. In general, flow measurement system 100 includes a meter body 110, a meter index 120, a meter index cover 130, a wireless meter transmitter adapter 140, and a wireless meter transmitter 150. Meter body 110 is operable to sense flow passing therethrough and communicate an indication of the flow to meter index 120. Meter index 120 is operable to display a visual representation of the flow indication and to communicate the flow indication to wireless meter transmitter 150. Meter index cover 130 protects meter index 120, and wireless meter transmitter 150 is coupled to meter index cover 130 by wireless meter transmitter adapter 140. Wireless meter transmitter 150 is operable to wirelessly communicate information regarding the flow. Flow measurement system 100 may, for example, be a flow meter.

In more detail, meter body 110 includes an inlet opening 112 that communicates with an interior of meter body 110, and an outlet opening 114 that also communicates with the interior of meter body 110. Inlet opening 112 and output opening 114 are located in a central body 115. Meter body 110 also includes meter sub-bodies 118 (one of which is shown) coupled to central body 115. In other implementations, meter body 110 may be a single piece or an assembly with a fewer or a greater number of components.

Meter body 110 internally houses a flow mechanism (not specifically shown) used in measuring a flow of fluid (i.e., gas, liquid, or a combination thereof) from inlet opening 112 to outlet opening 114. The measurement may be of the flow amount and/or rate. In one instance, the flow mechanism may include a Roots-type flow mechanism, which has intermeshing figure-8 shaped impellers, into which fluid flow from inlet opening 112 is directed. Passage of the flow through the flow mechanism and to outlet opening 114 causes the impellers to rotate in relation to the flow of the fluid. The rotational rate of the impellers is then measured to determine the amount or rate of flow. While mentioned as possibly having a Roots-type flow mechanism, in other implementations, the flow mechanism may include other types of mechanisms for use in measuring flow, such as other positive-displacement type meters, a turbine flow measurement system, a magnetic flow measurement system, an ultrasonic flow measurement system, or any other appropriate mechanism that translates fluid movement into a mechanical movement or an electrical signal.

The output of the flow mechanism is measured by meter index 120, which may be coupled to meter body 110. Meter index 120 transforms the output from the flow mechanism into a determination of flow amount and/or rate, and the determination of flow is represented on a display 122. The meter index may perform the transformation mechanically, electrically, or by using a combination of mechanical and electrical mechanisms.

In the illustrated implementation, meter index 120 may be coupled to one of meter sub-bodies 116 to measure rotation of figure-8 shaped impellers, transform the rotation to a determination of cumulative flow, and display the cumulative flow on display 122. Also, meter index 120 has a substantially cylindrical shape. In particular implementations, meter index 120 may be a pulser-ready counter, with or without temperature-compensation or magnetic shielding.

Meter index cover 130 houses meter index 120, including display 122. In certain implementations, meter index 120 is coupled to meter index cover 130. Meter index 120 may be coupled to meter index cover 130 by any appropriate technique. Meter index cover 130 is coupled to meter body 110. A ring seal 133 seals meter index cover 130 to meter body 110. Meter index cover 130 operates to shield meter index 120 from the environment in which flow measurement system 100 is installed, for example, by keeping dirt and moisture off the meter index's mechanism and display 122.

In this implementation, meter index cover 130 is a housing adapted to encase meter index 120 and having an open end 131 through which meter index 120 is received. Meter index cover 130 has a substantially cylindrical shape to house meter index 120. In other implementations, meter index cover 130, as well as meter index 120, may be configured in other shapes (e.g., square or rectangular).

To enable display 122 to be seen through meter index cover 130, at least a region 136 in the vicinity of display 122 is transparent. The transparency of region 136 may be achieved by forming meter index cover 130 entirely from a transparent material, such as transparent polymer, or by including transparent materials in an opaque material. If formed entirely from a transparent material, meter index cover 130 may be left entirely transparent or may be manufactured to be opaque or translucent in regions away from region 136, such as with paint or with a surface texture that reduces the transparency of the polymer. Polymer is one type of suitable material for meter index cover 130, because it is inexpensive and non-corrosive. Other appropriate materials, however, may be used.

In the illustrated implementation, meter index cover 130 couples to meter body 110 at sub-body 116. Sub-body 116 includes a meter body flange 117 extending radially from the sub-body. Flange 117 provides a substantially planar surface against which ring seal 133 may seal. Flange 117 also includes a plurality of threaded bolt holes 118. To couple to sub-body 116, meter index cover includes flange 132, which includes bolt holes 135. Bolts 134 pass through bolt holes 135 of flange 132 and are threadingly received in bolt holes 118. Tightening bolts 134 draws meter index cover flange 132 against meter body flange 117 and holds meter index cover 130 to meter body 110. Meter body flange 117 also includes an alignment ring 119 that substantially circumscribes an interior of ring seal 133. Alignment ring 119 operates to align meter index cover 130 with meter body 110, as well as to further shield meter index 120 from intrusion of moisture and particulate matter. Meter index cover flange 132 may be separate from, affixed to, or integral with meter index cover 130. In certain implementations, the meter index cover flange may be manufactured from an opaque material, such as metal (e.g., aluminum) or an opaque polymer, to shield ring seal 133 from ultraviolet (UV) damage. One type of UV-filtering polymer is sold under the trademark Lexan, type number OQ4320-1132, by the General Electric Corporation and to which the Lexan trademark is registered.

Although illustrated as a flanged connection with threaded connectors (bolts 134), meter index cover 130 may be held to meter body 110 by any other appropriate technique, for example, by using other types of connectors (such as snaps, rivets, spring clips, or other numerous types of fasteners), by threading meter index cover 130 directly to meter body 110, by providing a circlip connection between meter index cover 130 and meter body 110, or by any other appropriate manner that holds meter index cover 130 against meter body 110.

In certain implementations, ring seal 133 may be contained in a seal groove that circumscribes meter index cover 130. In other implementations, a seal groove may be provided on meter body 110, or a seal groove may be provided on both meter index cover 130 and meter body 110. The seal groove may be configured to receive and retain ring seal 133 when meter index cover 130 is apart from meter body 110. The seal groove may, for example, accomplish this by having an opening that is narrower than the width of the ring seal. The seal groove may further be configured so that the ring seal partially compresses and seals with the interior of the seal groove as well as meter body 110 when meter index cover 130 is mated to meter body 110. Thus, using a seal groove allows for retention of the seal prior to installation and provides for good seal alignment, which may improve the integrity of the resulting seal.

These features may be especially useful for pre-formed seals, such as flat elastomer or cork seals. With pre-formed seals, it is often difficult to maintain alignment of the seal while simultaneously trying to fit and align the meter index cover to the remainder of the flow measurement system. This difficulty may be exacerbated by environmental conditions (cold, rain, and/or contaminates (e.g., dirt and oil)) or if the seal must be aligned to a vertical surface.

With unmolded form-in-place type seals (e.g., a liquid polymer applied to the meter index to dry and form a seal), the resulting seal may stick to the index cover. It may be difficult, however, to form a consistent seal due to inconsistencies (such as ripples, bubbles, or surface contaminate) in the surface texture of the resulting seal. Also, if the seal is damaged, the meter index cover may need to be replaced or have the remnants of the seal removed and a new seal formed in place.

In certain implementations, ring seal 133 may be co-injected or overmolded with meter index cover 130. Co-injection involves injection molding both the meter index cover and the ring seal substantially simultaneously in the same mold. Over molding involves molding the ring seal onto the meter index cover, but unlike unmolded form-in-place type seals, using a mold to define the surface of ring seal 133. The result is a ring seal that adheres to meter index cover 130 to be retained when the meter index cover is apart from meter body 110 and that has a controlled surface texture to ensure a consistent seal.

In particular implementations, meter index cover 130 may use an elastomeric that has an X-shaped cross-section as a ring seal. In other implementations, however, other types of seals, for example, ring seals of other cross-sections (such as Y, H, circular, and polygonal cross-sections), ring seals incorporating a sealing bulb (for example, having a hollow D, P or B-shaped cross-section), or numerous other types of compressible seals formed from elastomer, polymer, metal, or otherwise may be used.

Meter index cover 130 also includes a mounting member 138, an example of which will be discussed in more detail below. Mounting member 138 is adapted to allow wireless meter transmitter adapter 140 to couple to meter index cover 130. Mounting member 138 may also allow other wireless meter transmitter adapters to couple to meter index cover 130. In certain implementations, one mounting member may be used for each meter index type. Mounting member 138 may be connected to (either directly or indirectly), affixed to, integral with, or otherwise coupled to meter index cover 130.

In particular implementations, mounting member 138 allows wireless meter transmitter adapter 140 to couple to meter index 120 in more than one orientation (e.g., vertical and horizontal). Mounting member 138 may also include a drive member that is coupled to a drive member of meter index 120 and a drive member of wireless meter transmitter 150. This coupling allows information (e.g., movement) to be communicated between meter index 120 and wireless meter transmitter 150.

Wireless meter transmitter adapter 140 provides an interface between meter index cover 130 and wireless meter transmitter 150. In particular implementations, wireless meter transmitter adapter 140 may provide an interface for one type of wireless meter transmitter. In other implementations, wireless meter transmitter adapter 140 may provide an interface for more than one type of wireless meter transmitter. Examples of wireless meter transmitter adapter 140 will be discussed in more detail below.

Wireless meter transmitter 150 may be any appropriate type of device for sending wireless information regarding flow. Wireless meter transmitter 150 may operate in the radio frequency (RF), infrared (IR), or any other appropriate portion of the electromagnetic spectrum. Appropriate wireless meter transmitters are available from Cellnet Data Systems, Inc. of Alpharetta, Ga. and Itron Inc. of Spokane, Wash.

Figure 2:
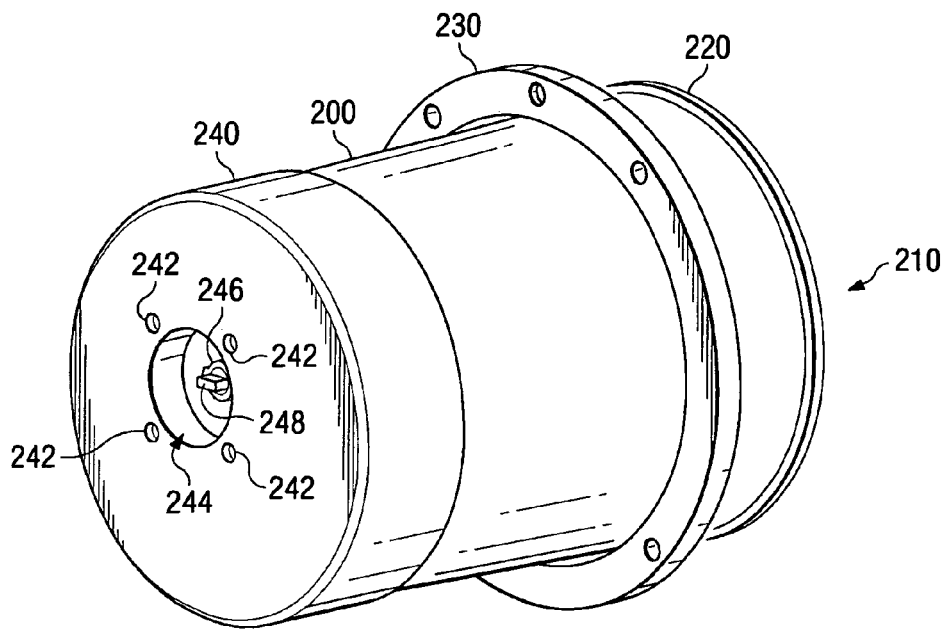
FIG. 2 is a perspective view illustrating one implementation of a meter index cover for the flow measurement system of FIG. 1.

FIG. 2 illustrates an example meter index cover 200. Meter index cover 200 includes an opening 210 through which a meter index may be received. Surrounding meter index cover 200 is a shoulder 220 and a flange 230. Shoulder 220 and flange 230 work in cooperation with each other to couple meter index cover 200 to a flow meter. Flange 230 may, for example, abut shoulder 220 when clamping the meter index cover to the meter body. As can be seen, flange 220 is separate from, and movable relative to, the meter index cover.

Meter index cover 200 also includes a mounting member 240. Mounting member 240 is adapted to couple to one or more types of wireless meter transmitter adapters in one or more orientations. This allows a wireless meter transmitter to couple to meter index cover 200 in more than one orientation. This may be important in situations where a wireless meter transmitter has a preferred orientation for transmission. As illustrated, mounting member 240 is affixed to meter index cover 200. In other implementations, it may be otherwise coupled thereto.

To accomplish the multiple orientation coupling, mounting member 240 includes apertures 242. Apertures 242 may serve to align and secure a wireless meter transmitter adapter to mounting member 240. In other implementations, however, other arrangements may be used (e.g., two hole or six hole). In a particular implementation, a central post with an attachment device (e.g., a wing nut) could be used.

Mounting member 240 also includes a drive system 244. Drive system 244 is adapted to be coupled to a drive member of a meter index and a drive member of a wireless meter transmitter. By being so coupled, drive system 244 may be driven by the meter index drive member and drive the wireless meter transmitter drive member. This allows information regarding a flow to be transmitted to the wireless meter transmitter.

As illustrated, drive system 244 includes a drive member 246 (e.g., a drive dog). Drive member 246 may, for example, be a shaft that is rotationally driven by a meter index drive member such as a gear. To engage the gear, the shaft may, for instance, have a paddle or be cross-drilled with a spring pin therethrough. Drive member 246 may, for example, be coupled to the rest of mounting member 240 by a bearing. Drive member 246 includes an interface portion 248. Interface portion 248, illustrated here as a tongue, allows drive member to engage other drive members. In particular implementations, interface portion 248 may engage a drive member adapter located between drive member 246 and a drive member of a wireless meter transmitter to transfer motion therebetween. In general, interface portion 248 may have any appropriate shape for interfacing with another drive member component (e.g., hexagonal socket or D-flat shaft).

Mounting member 240 may be composed of any appropriate material. For example, mounting member 240 may be composed of ABS, Delrin, or aluminum. In certain implementations, it may be beneficial if mounting member 240 is UV stable.

Figure 3A:
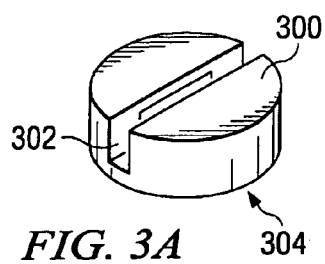
FIGS. 3A–C are perspective views illustrating implementations of drive member adapters for the mounting member of FIG. 2.
Figure 3B:
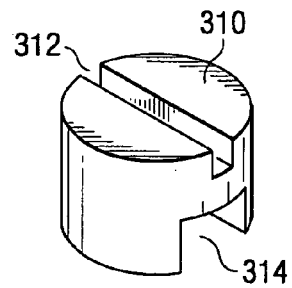
Figure 3C:
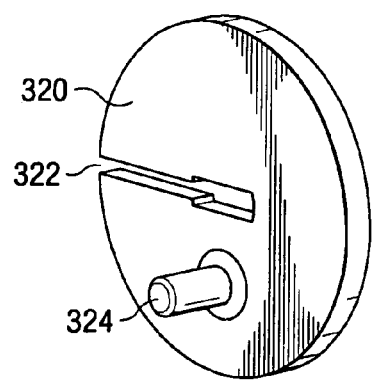

FIGS. 3A–C illustrate drive member adapters 300, 310, and 320. As mentioned previously, drive member adapters may be coupled between a drive member of a mounting member and a drive member of a wireless meter transmitter to transfer motion between the two.

Drive member adapter 300 is shaped as a disc and includes a slot 302 to couple to (e.g., engage) interface portion 248 of mounting member 240. By this coupling, drive member adapter 300 is driven by the drive member of mounting member 240. This coupling may be accomplished by a press fit, a spring clip, an adhesion, or any other appropriate coupling. In other implementations, slot 302 may have any other appropriate shape (e.g., a hexagonal socket). Drive member adapter 300 also includes an interface portion 304 (a portion of which is visible) on the opposite side from slot 302 to couple to a drive member of a wireless meter transmitter. Interface portion 304 may, for example, provide a spring-friction set onto a gear of a wireless meter transmitter drive member. In particular implementations, the interface portion may include a tooth system to engage a cog. These implementations may be particularly suited for interfacing with an Itron 40G Electronic Remote Transmitter (ERT) designed for an Invensys meter.

Drive member adapter 310 is shaped as a cylinder and includes a slot 312 to couple to (e.g., engage) interface portion 248 of mounting member 240. By this coupling, drive member adapter 310 is driven by the drive member of mounting member 240. This coupling may be accomplished by any appropriate technique. Drive member adapter 310 also includes an interface portion 314 on the opposite side from slot 312 to couple to a drive member of a wireless meter transmitter. In this implementation, the interface portion is a slot to engage an arm on a wireless meter transmitter drive member. This implementation may be particularly suited for interfacing with an Itron 40G ERT designed for an American Meter Company diaphragm meter.

Drive member adapter 320 is shaped as a thin disc. In the disc is a slot 322 to couple to (e.g., engage) interface portion 248 of mounting member 240. By this coupling, drive member adapter 320 is driven by the drive member of mounting member 240. This coupling may be accomplished by any appropriate technique. Drive member adapter 320 also includes an interface portion 324 to couple to a drive member of a wireless meter transmitter. In this implementation, the interface portion is an arm to engage an aperture on a wireless meter transmitter drive member. This implementation may be particular suited for interfacing with a Cellnet Data Systems' wireless transmitter.

Although FIGS. 3A–C illustrate three implementations of a drive member adapters, other implementations of drive member adapters may have other configurations. For example, other drive member adapters may have different shapes (e.g., shafts, rods, or linkages) and may have different interface portions for the meter index cover and/or the wireless meter transmitter (e.g., a hexagonal socket and ball).

Figure 4A:
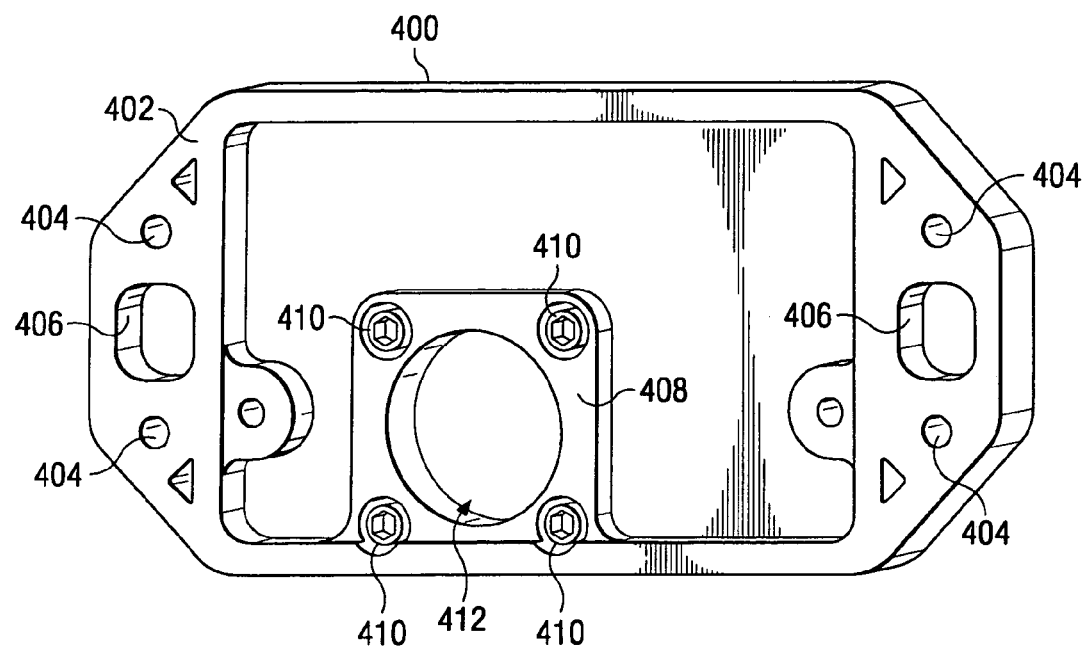
FIGS. 4A–B are perspective views illustrating implementations of wireless meter transmitter adapters for the flow meter of FIG. 1.
Figure 4B:
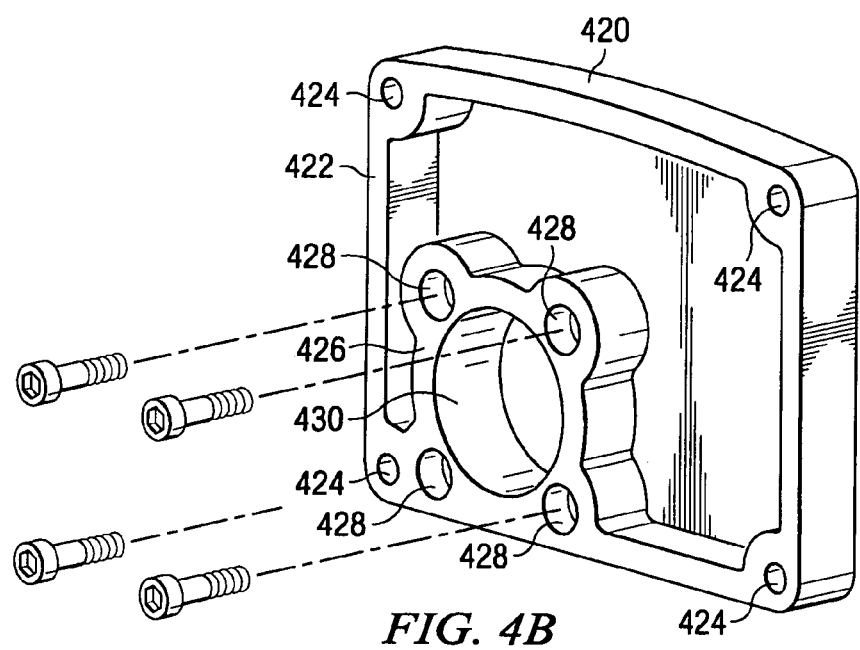

FIGS. 4A–B illustrate implementations of wireless meter transmitter adapters 400, 420. Each of these wireless meter transmitter adapters may be especially configured and arranged for a particular type of wireless meter transmitter. As illustrated, wireless meter transmitter adapter 400 is adapted to couple an American Meter style meter transmitter to a meter index cover, and wireless meter transmitter adapter 420 is adapted to couple a Rockwell style meter transmitter to a meter index cover. An adapter for a Cellnet Data Systems meter transmitter may be similar to adapter 400.

Wireless meter transmitter adapter 400 includes a mounting frame 402 and a mounting frame 408. Mounting frame 402 is adapted for coupling to a wireless meter transmitter, and mounting frame 408 is adapted for coupling to a meter index cover. Mounting frame 402 allows a tight seal to be achieved between wireless meter transmitter adapter 400 and a wireless meter transmitter, and mounting frame 408 allows a tight seal to be achieved between wireless meter transmitter adapter 400 and a meter index cover.

Mounting frame 402 includes a number of apertures 404 through which the coupling between wireless meter transmitter adapter 400 and a wireless meter transmitter may be achieved. Apertures 404, which may be threaded, may provide for alignment between wireless meter transmitter adapter 400 and the wireless meter transmitter and for securing wireless meter transmitter to the wireless meter transmitter adapter. For example, bolts may be inserted through apertures 404 to align and secure the wireless meter transmitter. Mounting frame 402 also includes apertures 406. Apertures 406 allow a uniform mold thickness to be used in forming wireless meter transmitter adapter 400.

Mounting frame 408 includes a number of apertures 410 through which the coupling between wireless meter transmitter adapter 400 and a meter index cover may be achieved. Apertures 410 may provide for alignment between wireless meter transmitter adapter 400 and the meter index cover and for securing the wireless meter transmitter adapter to the meter index cover. For example, bolts may be inserted through apertures 410 to align and secure the wireless meter transmitter adapter. The arrangement and location of apertures 410 also allow wireless meter transmitter adapter 400 to be oriented at one or more orientations relative to the meter index cover. Mounting frame 408 also includes an aperture 412. Aperture 412 may, for example, allow access to a drive member of a mounting member. In some implementations, aperture 412 is also adapted to receive a drive member adapter.

Wireless meter transmitter adapter 420 includes a mounting frame 422 and a mounting frame 426. Mounting frame 422 is adapted for coupling to a wireless meter transmitter, and mounting frame 426 is adapted for coupling to a meter index cover. Mounting frame 422 allows a tight seal to be achieved between wireless meter transmitter adapter 420 and a wireless meter transmitter, and mounting frame 426 allows a tight seal to be achieved between wireless meter transmitter adapter 420 and a meter index cover.

Mounting frame 422 includes a number of apertures 424 through which the coupling between wireless meter transmitter adapter 420 and a wireless meter transmitter may be achieved. Apertures 424, which may be threaded, may provide for alignment between wireless meter transmitter adapter 420 and the wireless meter transmitter and for securing wireless meter transmitter to the wireless meter transmitter adapter. For example, bolts may be inserted through apertures 424 to align and secure the wireless meter transmitter.

Mounting frame 426 includes a number of apertures 428 through which the coupling between wireless meter transmitter adapter 420 and a meter index cover may be achieved. Apertures 428 may provide for alignment between wireless meter transmitter adapter 420 and the meter index cover and for securing the wireless meter transmitter adapter to the meter index cover. For example, bolts may be inserted through apertures 428 to align and secure the wireless meter transmitter adapter. The arrangement and location of apertures 428 also allow wireless meter transmitter adapter 420 to be oriented at one or more orientations relative to the meter index cover. Mounting frame 426 also includes an aperture 430. Aperture 430 may, for example, allow access to a drive member of a mounting member. In some implementations, aperture 430 is also adapted to receive a drive member adapter.

Although FIGS. 4A–B illustrate two implementations of wireless meter transmitter adapters, other implementations of wireless meter transmitter adapters may have other configurations. For example, other wireless meter transmitter adapters may have a different arrangement of mounting frames. Also, the mounting frames may have different shapes. As another example, a mounting frame may include a sealing member (e.g., a gasket) to assist in forming a seal between the mounting frame and the component to which it is to be coupled. As an additional example, a wireless meter transmitter adapter may include an aperture to act as a drain. The drain may allow condensation and other liquid to escape from system 100.

System 100 provides a variety of features. For example, a fluid meter may be manufactured and/or retrofitted with a wireless meter transmitter. This may provide ease of managing and controlling a fluid flow system. As another example, multiple types of wireless meter transmitters may be coupled to a fluid meter. Thus, a manufacturer, installer, and/or retrofitter of a fluid meter is not bound to using one type of wireless meter transmitter with a particular type of fluid meter, which may provide consistency and ease of operation across a fluid meter network. As a further example, a wireless meter transmitter may be installed at a preferred orientation. This may assist in readily sending/retrieving the flow information.

Figure 5:
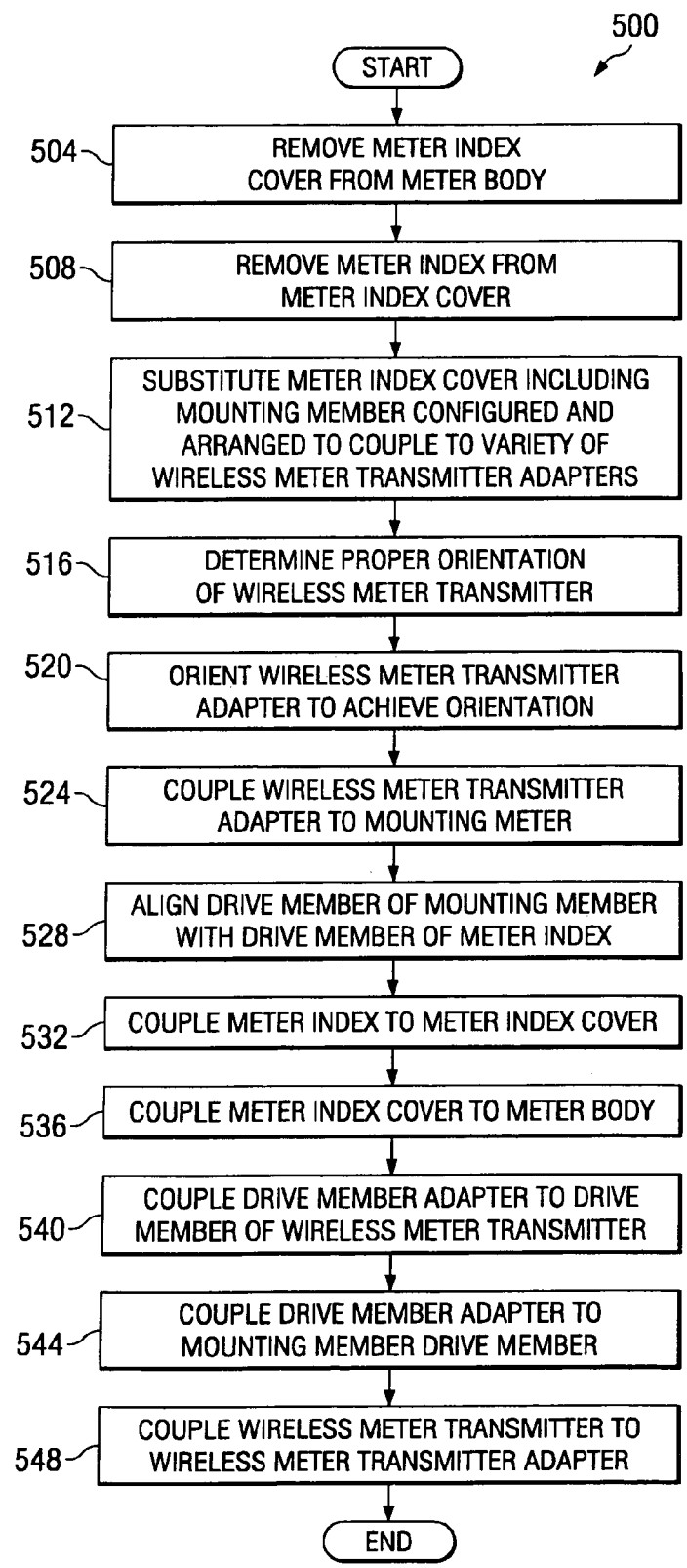
FIG. 5 is a flow chart illustrating one implementation of a process for manufacturing a flow measurement system.

FIG. 5 illustrates a process 500 for manufacturing a flow measurement system. Process 500 may, for example, illustrate a process for manufacturing flow measurement system 100.

Process 500 begins with removing a meter index cover from a meter body, which may house a flow measuring device (operation 504). The meter body may, for example, be adapted to produce a movement indicative of a flow from an inlet of the meter body to an outlet of the meter body. The meter index cover houses a meter index, and the process continues with removing the meter index from the meter index cover (operation 508). Removing the meter index from the meter index cover may include decoupling (e.g., unscrewing) the meter index from the meter index cover.

Process 500 calls for substituting a meter index cover including a mounting member configured and arranged to couple to a variety of wireless meter transmitter adapters for the removed meter index cover (operation 512). The mounting member may be integral with the substituted meter index cover and may include any appropriate coupling elements and arrangement thereof for coupling to wireless meter transmitter adapters.

Process 500 also calls for determining the proper orientation of a wireless meter transmitter (operation 516). The wireless meter transmitter may be any appropriate transmitter for sending flow information from a flow measurement system. The proper orientation may, for example, be for the wireless meter transmitter to be upright. Process 500 continues with orienting a wireless meter transmitter adapter relative to the mounting member to achieve the orientation for the wireless meter transmitter (operation 520) and coupling the wireless meter transmitter adapter to the mounting member (operation 524). The wireless meter transmitter adapter is configured and arranged to provide a coupling between the wireless meter transmitter and the mounting member. In particular implementations, the coupling may be achieved in at least two orientations. Coupling the wireless meter transmitter adapter to the mounting member may, for example, be accomplished by detachable couplers (e.g., screws).

Process 500 calls for aligning a drive member of the mounting member with a drive member of the meter index (operation 528). The mounting member drive member may, for example, be a shaft with a tongue (e.g., a blade) on the end opposite the meter index. The process continues with coupling the meter index to the substituted meter index cover (operation 532). The meter index may be coupled to the substituted meter index cover by the same technique used to couple to the original meter index cover.

Process 500 also calls for coupling the substituted meter index cover to the meter body (operation 536). The substituted meter index cover may, for example, be coupled to the meter body by the same technique used to couple the original meter index cover to the meter body.

Process 500 also calls for coupling a drive member adapter to a drive member of the wireless meter transmitter (operation 540). The drive member adapter may be coupled to the wireless meter transmitter drive member by engaging the two (e.g., by press fit) or by otherwise interfacing the two. The drive member adapter is also configured and arranged to interface with the drive member of the mounting member. Process 500 continues with coupling the drive member adapter to the drive member of the mounting member (operation 544). Coupling the drive member adapter to the drive member of the mounting member may, for example, include press fitting the drive member adapter to the drive member or otherwise engaging the drive member adapter with the drive member. Process 500 concludes with coupling the wireless meter transmitter to the wireless meter transmitter adapter (operation 548). Coupling the wireless meter transmitter to the wireless meter transmitter adapter may, for example, be accomplished by engaging threaded fasteners therewith.

Although FIG. 5 illustrates one process for manufacturing a flow measurement system, other processes for manufacturing a flow measurement system may include fewer, additional, and/or a different arrangement of operations. For example, a process may call for determining a proper wireless meter transmitter adapter. Particular implementations may, for instance, have different wireless meter transmitter adapters for each type of wireless meter transmitter. As another example, a process may not call for coupling a drive member adapter to a drive member of the wireless meter transmitter. This may, for instance, occur if the drive member of the wireless meter transmitter can directly interface with the drive member of the mounting member. As an additional example, the meter index cover may not have to be removed from the meter body, the meter index may not have to be removed from the meter index cover, and an index cover including a mounting member may not have to be substituted. This may, for instance, occur if the wireless meter transmitter is being installed contemporaneously with the initial manufacture or installation of a flow meter. As a further example, the meter index may be coupled to the meter index cover including the mounting member before determining a proper orientation for the wireless meter transmitter or coupling the wireless meter transmitter adapter to the mounting member. As another example, the meter index cover may be coupled to the meter body after coupling the drive member adapter to the wireless meter transmitter drive member or coupling the wireless meter transmitter to the wireless meter transmitter adapter.

A number of implementations have been described, and various other implementations have been mentioned or suggest. Moreover, various additions, deletions, substitutions, and/or modifications to these implementations will be readily suggested to those skilled in the art while still achieving flow measurement. For at least these reasons, the invention is to be measured by the scope of the appended claims, which may encompass one or more of the implementations.

The invention claimed is:

1. A system for flow measurement, the system comprising:
   a meter body housing a flow measuring device operable to produce an indication of a flow from an inlet of the meter body to an outlet of the meter body;
   an meter index coupled to the meter body, the meter index operable to display flow information in response to the indication;
   a meter index cover coupled to the meter body, the meter index cover configured and arranged to house the meter index, the meter index cover defining an opening through which the meter index is received and comprising a mounting member configured and arranged to couple to a variety of wireless meter transmitter adapters;
   a wireless meter transmitter adapter coupled to the mounting member, the wireless meter transmitter adapter configured and arranged to allow coupling to a wireless meter transmitter;
   a wireless meter transmitter coupled to the wireless meter transmitter adapter; and
   a drive member adapter coupled between a drive member of the meter index and a drive member of the wireless meter transmitter,
   wherein the mounting member comprises a drive member that is coupled between the meter index drive member and the drive member adapter and wherein an end of the mounting member drive member opposite the meter index comprises a tongue, and the drive member adapter comprises a slot for receiving the tongue.

2. A system for flow measurement, the system comprising:
   a meter body housing a flow measuring device operable to produce a movement indicative of a flow from an inlet of the meter body to an outlet of the meter body;
   an meter index coupled to the meter body, the meter index operable to display an indication of a flow in response to the movement;
   a meter index cover coupled to the meter body, the meter index cover configured and arranged to house the meter index, the meter index cover defining an opening through which the meter index is received and comprising:
  a transparent region through which a display portion of the meter index can be observed, and
  an integral mounting member configured and arranged to couple to a variety of wireless meter transmitter adapters, the mounting member comprising a drive shaft that is coupled to a drive member of the meter index on one end and that comprises a tongue on the other end;
a wireless meter transmitter adapter coupled to the mounting member, the wireless meter transmitter adapter configured and arranged to allow coupling to the mounting member in at least two orientations and to allow coupling to a wireless meter transmitter, the wireless meter transmitter adapter comprising a drain to allow moisture to exit the system;
a wireless meter transmitter coupled to the wireless meter transmitter adapter, the wireless meter transmitter comprising a drive member; and
a drive member adapter coupled between the mounting member drive member and the wireless meter transmitter drive member, the drive member adapter comprising a slot for receiving the tongue.

* * * * *